United States Patent
Joshi et al.

(10) Patent No.: US 8,549,271 B1
(45) Date of Patent: *Oct. 1, 2013

(54) METHOD, SYSTEM, AND COMPUTER READABLE MEDIUM FOR UPDATING AND UTILIZING THE CONTENTS OF A NON-ESSENTIAL REGION OF A MEMORY DEVICE

(75) Inventors: Anand Joshi, Round Rock, TX (US); Juan F. Diaz, Round Rock, TX (US)

(73) Assignee: American Megatrends, Inc., Norcross, GA (US)

( * ) Notice: Subject to any disclaimer, the term of this patent is extended or adjusted under 35 U.S.C. 154(b) by 631 days.

This patent is subject to a terminal disclaimer.

(21) Appl. No.: 12/412,920

(22) Filed: Mar. 27, 2009

Related U.S. Application Data

(63) Continuation of application No. 10/736,380, filed on Dec. 15, 2003, now Pat. No. 7,536,536.

(51) Int. Cl.
*G06F 9/24* (2006.01)
*G06F 15/177* (2006.01)

(52) U.S. Cl.
USPC ............ 713/1; 713/2; 713/100; 717/168

(58) Field of Classification Search
USPC ................ 713/1, 2, 100; 717/168
See application file for complete search history.

(56) References Cited

U.S. PATENT DOCUMENTS

| | | | |
|---|---|---|---|
| 5,864,698 A * | 1/1999 | Krau et al. | 713/2 |
| 6,581,157 B1 | 6/2003 | Chiles et al. | |
| 6,665,813 B1 | 12/2003 | Forsman et al. | |
| 6,892,297 B1 * | 5/2005 | Aguilar et al. | 713/2 |
| 6,990,577 B2 * | 1/2006 | Autry | 713/100 |
| 7,017,040 B2 | 3/2006 | Singer et al. | |
| 7,536,536 B1 * | 5/2009 | Joshi et al. | 713/1 |
| 2003/0110472 A1 | 6/2003 | Alloing et al. | |
| 2003/0167373 A1 | 9/2003 | Winters et al. | |
| 2004/0088534 A1 | 5/2004 | Smith et al. | |
| 2006/0080650 A1 | 4/2006 | Winters et al. | |

OTHER PUBLICATIONS

U.S. Official Action dated Jun. 26, 2006 in U.S. Appl. No. 10/736,380.
U.S. Official Action dated Nov. 22, 2006 in U.S. Appl. No. 10/736,380.

(Continued)

*Primary Examiner* — Kim Huynh
*Assistant Examiner* — Michael J Brown
(74) *Attorney, Agent, or Firm* — Hope Baldauff, LLC

(57) ABSTRACT

A method and system are provided for updating an utilizing the contents of a non-essential region in a memory device in a computer system. A computer program is utilized to build an image file. The image file may include program code and data for operating a computer system. The image file includes an essential region for storing program code required to boot the computer system and a non-essential region for storing program code and data which is not required to boot the computer system. The non-essential program code may include graphics data, a language module, or diagnostic tools for the computer system. After building the image file, the image file is then copied to a memory device in the computer system. Finally, only the non-essential region in the memory device is updated. A method may also be utilized to execute program code contained in the non-essential region prior to executing program code contained in the essential region.

20 Claims, 6 Drawing Sheets

(56) References Cited

OTHER PUBLICATIONS

U.S. Official Action dated Mar. 8, 2007 in U.S. Appl. No. 10/736,380.
U.S. Official Action dated Aug. 20, 2007 in U.S. Appl. No. 10/736,380.
U.S. Official Action dated Feb. 22, 2008 in U.S. Appl. No. 10/736,380.
U.S. Official Action dated Aug. 25, 2008 in U.S. Appl. No. 10/736,380.
U.S. Notice of Allowance / Allowability dated Dec. 29, 2008 in U.S. Appl. No. 10/736,380.

* cited by examiner

METHOD, SYSTEM, AND COMPUTER READABLE MEDIUM FOR UPDATING AND UTILIZING THE CONTENTS OF A NON-ESSENTIAL REGION OF A MEMORY DEVICE

RELATED APPLICATIONS

This application is a continuation of U.S. patent application Ser. No. 10/736,380 filed Dec. 15, 2003, entitled "Method, System, and Computer Readable Medium for Updating and Utilizing the Contents of a Non-Essential Region of a Memory Device," now U.S. Pat. No. 7,536,536, which is expressly incorporated herein in its entirety by reference.

TECHNICAL FIELD

The present invention is related to computer system configuration. More particularly, the present invention is related to partially updating an image in a memory device.

BACKGROUND OF THE INVENTION

Some computer systems have a firmware basic input/output system ("BIOS") containing basic routines which are accessed to boot the computer as well as to initialize and interface hardware with operating system software. The BIOS code is stored as groups of memory "blocks" in one or more non-volatile memory devices. These groups of memory blocks which are stored in the non-volatile memory devices are collectively known as an image. In many modern computer systems, the non-volatile memory devices are re-programmable. These re-programmable memory devices, which are typically known as "flash" memory devices or parts, are a type of non-volatile random access memory ("NVRAM") that allows the BIOS code to be updated by using software to erase and program each flash memory device.

The image stored in a flash memory device is typically divided into at least two main sections or regions. One such region is known as the "boot block" region and contains the first program code executed by the computer system after it is turned on. Another region is known as the "main BIOS" region which is built as a single unit and includes the program code for the power-on self test ("POST") portion of the computer startup sequence as well as for managing computer system resources when the computer is running (i.e., "runtime"). The main BIOS region of the image may also contain optional program code and data which is not essential to the computer startup or runtime sequences. This "non-essential" program code may include language modules for providing foreign language support in the computer system or a graphic image which may be displayed to a user during the computer startup sequence.

Occasionally a user may wish to update only a portion of the code in the main BIOS region without having to re-program the entire region. For example, a user may wish to add custom graphics data so that a picture of the user is displayed instead of a default graphic provided by the manufacturer of the computer startup sequence. However, updating this region in a memory device currently requires creating an entirely new image and re-programming each memory block in the main BIOS region, regardless of whether each block actually needs updating. Thus, in updating the main BIOS region, blocks remaining unchanged from a previous version would still be updated by the conventional update process. Furthermore, since the main BIOS region of an image is built as a single unit, errors or corrupted data in even non-essential program modules may cause the computer system to become unbootable.

It is with respect to these considerations and others that the present invention has been made.

SUMMARY OF THE INVENTION

In accordance with the present invention, the above and other problems are solved by a method and system for updating and utilizing the contents of a non-essential region of one or more flash memory devices in a computer system. The non-essential region may include non-essential BIOS code or data for the computer system.

According to the method, a computer program is utilized to build an image file. The image file may include critical program code and data for operating a computer system. The image file defines a non-essential region for storing non-essential program code and data which is not required to boot the computer system. After building the image file, the image file is then copied to a memory device in the computer system. Finally, only the non-essential region is updated in the memory device. The method may further include executing the program code in the non-essential region of the memory device prior to executing the critical program code. The non-essential region may include one or more non-essential blocks for storing program code and data. The non-essential blocks may be updated in the memory device by mapping each non-essential block to one or more reserved sectors in the memory device. Each non-essential block may also be mapped to a portion of a sector in the memory device. Each non-essential block may include a header and one or more modules. The header may include a pointer to a first module in the non-essential block. Each module may include a module header and module data. The module data may include program code or data. The data included in each module may be a graphics data, a language module, or diagnostic tools for the computer system.

According to another method, a computer program routine utilizes a non-essential region in a memory device for executing updated program code in a computer system. The memory device may store a BIOS image for the computer system. The BIOS image may include program code for starting and operating the computer system. The memory device is divided into an essential region and a non-essential region. The essential region of the memory device may include modules storing current program code for the BIOS image. The non-essential region of the memory device may include modules storing updated program code for the BIOS image. When the computer system is started, the routine first searches the non-essential region in the memory device for one or more modules containing program code to execute. If the modules are found in the non-essential region, then the updated program code in these modules is executed. If the modules are not found, then the routine searches the essential region in the memory device for the modules. If the modules are found in the essential region, then the current program code in these modules is executed. The routine may search for a header contained in each module to identify the module.

In accordance with other aspects, the present invention relates to a computer system for updating and utilizing the contents of a non-essential region in a memory device. The computer system includes a memory device for storing an image file. The image file includes a non-essential region for storing non-essential program code and data. The computer system also includes a memory for storing a program containing code for updating the memory device. The computer system further includes a processor, functionally coupled to the memory and associated with the memory device. The processor is responsive to computer-executable instructions contained in the program and operative to copy the image file to the memory device and update only the non-essential region in the memory device.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Figure 1:
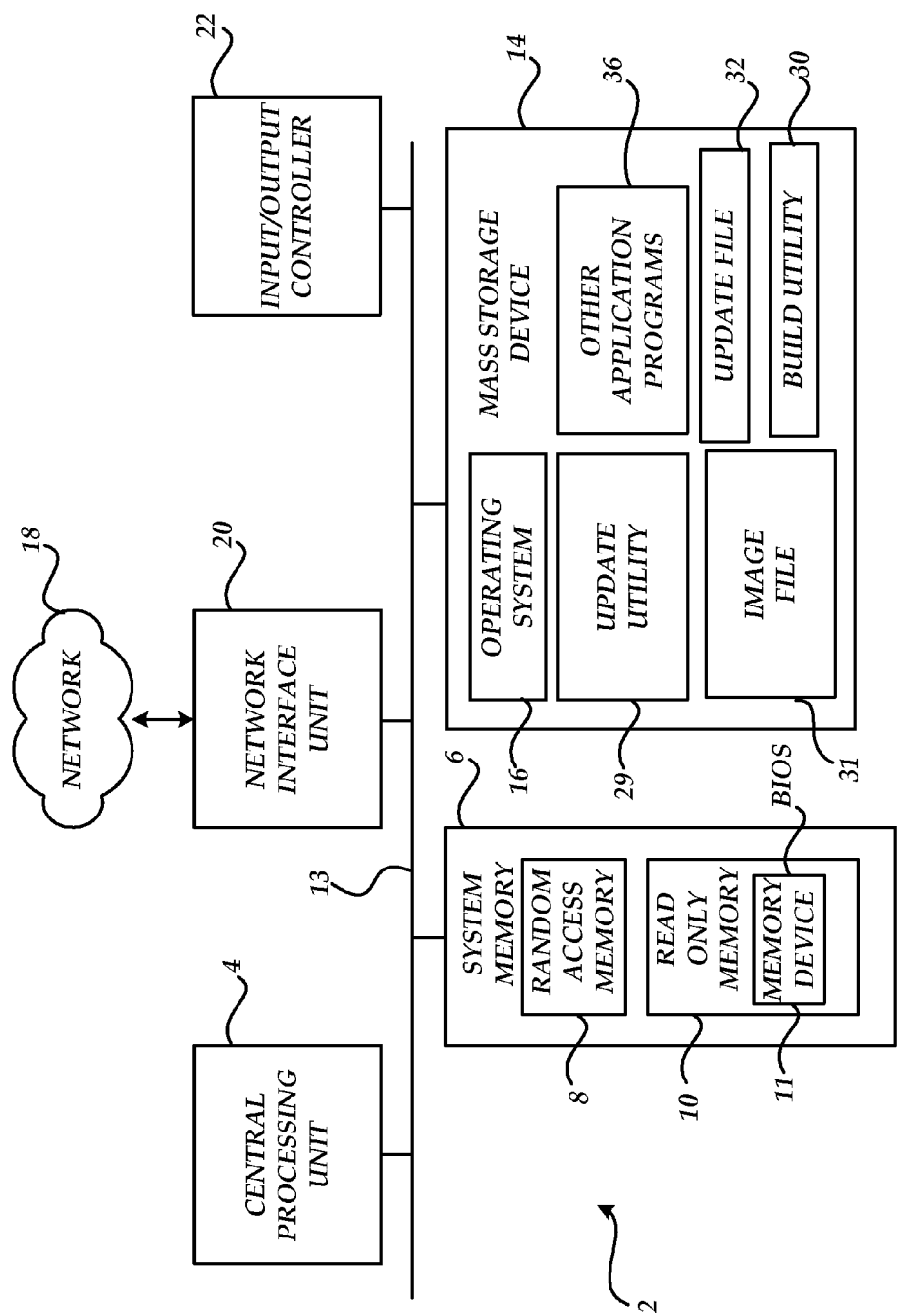
FIG. 1 illustrates a computer system architecture which may be utilized in various embodiments of the invention.

Embodiments of the present invention provide a method, system, and computer-readable medium for updating and utilizing the contents of a non-essential region in one or more memory devices in a computer system. In the following detailed description, references are made to the accompanying drawings that form a part hereof, and in which are shown by way of illustrating specific embodiments or examples. Referring now to the drawings, in which like numerals represent like elements through the several figures, aspects of the present invention and the exemplary operating environment will be described.

FIG. 1 and the following discussion are intended to provide a brief, general description of a suitable computing environment in which the invention may be implemented. While the invention will be described in the general context of program modules that execute in conjunction with an application program that runs on an operating system on a computer system, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a computer system 2 which was discussed briefly above, for practicing the various embodiments of the invention will be described. The computer system 2 comprises a standard local or server computer operative to execute one or more application programs. Alternatively, the computer system 2 may comprise another type of computing device operative to access a network 18, such as a personal digital assistant or other type of computer. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 13 that couples the system memory 6 to the CPU 4.

The ROM 10 further comprises a memory device 11 which may store a basic input/output system ("BIOS") or other program code or data. As is known to those skilled in the art, the BIOS includes basic routines that help to transfer information between elements within a computer. These basic routines are accessed to boot the CPU as well as to initialize and interface hardware with operating system software. One such routine is the power-on self test ("POST") routine. The POST routine is executed after the computer is turned on for performing diagnostics and initializing system components. It will be appreciated that the contents of the memory device 11 may be organized as multiple blocks or sectors in which are stored the program code or data. It will be further appreciated that the memory device 11 may be a re-programmable or "flash" memory device. As is known to those skilled in the art, flash memory devices enable blocks of data to be erased and reprogrammed so that data can be easily updated. The contents of the memory device 11 will be described in greater detail below with respect to FIG. 6.

The computer system 2 further includes a mass storage device 14 for storing an operating system 16, an update utility 29, a build utility 30, an image file 31, an update file 32, and other application programs 36. The mass storage device 14 is connected to the CPU 4 through a mass storage controller (not shown) connected to the bus 13. The mass storage device 14 and its associated computer-readable media, provide non-volatile storage for the computer system 2. Although the description of computer-readable media contained herein refers to a mass storage device, such as a hard disk or CD-ROM drive, it should be appreciated by those skilled in the art that computer-readable media can be any available media that can be accessed by the computer system 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the computer system 2 may operate in a networked environment using logical connections to remote computers through the network 18. The computer system 2 may connect to the network 18 through a network interface unit 20 connected to the bus 13. It should be appreciated that the network interface unit 20 may also be utilized to connect to other types of networks and remote computer systems. The computer system 2 may also include an input/output controller 22 for receiving and processing input from a number of devices, including a keyboard, mouse, or electronic stylus (not shown in FIG. 1). Similarly, an input/output controller 22 may provide output to a display screen, a printer, or other type of output device.

As discussed briefly above, the mass storage device 14 stores the build utility 30 and the update utility 29. The build utility 30 includes program code for defining the layout of content (i.e., program code and data) in the image file 31. The update utility 29 includes program code and/or data for updating the memory device 11 with new content such as the image file 31 and the update file 32. The image file 31 and the update file 32 may be utilized to update or add new functionality to the BIOS in the memory device 11. The layout of the image file 31 will be described in greater detail with respect to FIG. 2 below. To update the BIOS code, the update utility 29 is launched from the mass storage device 14 on the CPU 4 which executes the code for updating the memory device 11. Upon launching the update utility 29, the new content is loaded into the RAM 8. The CPU 4 in executing the code to update the memory device 11, issues commands to erase the contents of each memory device. The CPU 4 in executing the code may further issue commands to program the contents of each memory device with the new content. The logical operations performed by the update utility 29 for updating the memory device 11 will be described in greater detail in the discussion of FIGS. 7-8 below.

According to various embodiments of the invention, the computer system 2 may operate in a networked environment using logical connections to remote computers through the network 18. The computer system 2 may connect to the network 18 through a network interface unit 20 connected to the bus 13. It should be appreciated that the network interface unit 20 may also be utilized to connect to other types of networks and remote computer systems. The computer system 2 may also include an input/output controller 22 for receiving and processing input from a number of devices, including a keyboard, mouse, or electronic stylus (not shown in FIG. 1). Similarly, an input/output controller 22 may provide output to a display screen, a printer, or other type of output device.

Figure 2:
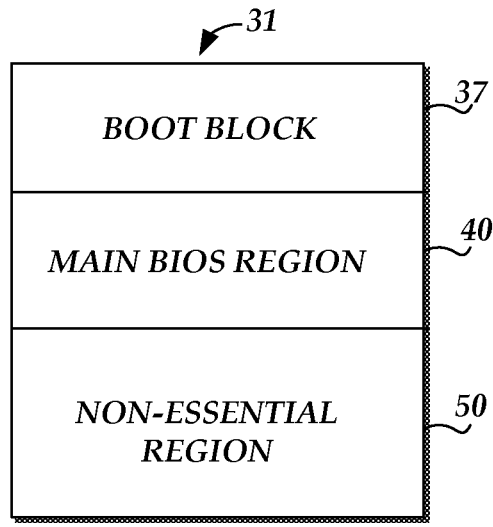
FIG. 2 is a block diagram showing a layout of the image file in the computer system of FIG. 1 according to an embodiment of the invention.

FIG. 2 illustrates a layout of the image file 31 described in the computer system of FIG. 1 according to an embodiment of the invention. As briefly discussed above in the description of FIG. 1, the image file 31 may include the BIOS program code for the computer system 2. As shown in FIG. 2, the image file 31 is divided into three sections or regions including a boot block region 37, a main BIOS region 40 and a non-essential region 50. The boot block region 37 contains the program code required to boot the CPU 4 in the computer system 2. It will be appreciated by those skilled in the art that the boot block region 37 may additionally contain program code for a variety of other functions such as system recovery and updating other sections of the image file.

The main BIOS region 40 follows the boot block region 37 and contains the POST and runtime program code of the BIOS. It will be appreciated that the locations of the main BIOS region 40 and the non-essential region 50 in the image file 31 may be arbitrary. That is, the non-essential region 50 may be placed above the main BIOS region 40 or vice-versa. It will further be appreciated that the image file 31 may include more than one non-essential region 50.

As is known to those skilled in the art, the program code in the main BIOS region 40 may be stored as a linked list of executable modules. Each module is prefaced with a header that contains a pointer to the next module in the list. It will be appreciated that the ordering of the modules in the list may be arbitrary as each module is identified by an identification code stored in its header.

The non-essential region 50 follows the main BIOS region 40. In one embodiment of the invention, the non-essential region 50 contains non-essential or optional blocks such that, in their absence, the program code in the boot block 37 and the main BIOS region 40 required for booting the CPU (e.g., the POST program code) will still execute. The contents of the non-essential blocks in the non-essential region 50 may include, but are not limited to, option ROM for onboard devices, graphics data, language modules, setup clients, and user-defined modules. It will be appreciated that when the image file 31 is built, the non-essential region 50 is defined to be independent of the main BIOS region 40. That is, none of the program code in the main BIOS region 40 is linked to the optional program code in the non-essential region 50. The contents of the non-essential region 50 will be discussed in greater detail in the description of FIG. 3 below.

Figure 3:
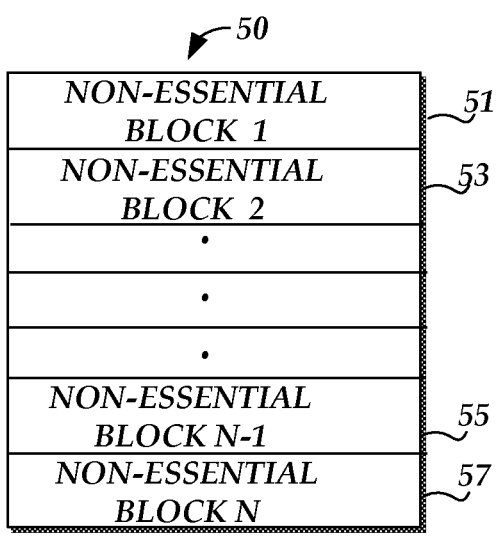
FIG. 3 is a block diagram showing a layout of the non-essential region in the image file illustrated in FIG. 2 according to an embodiment of the invention.

FIG. 3 is a block diagram showing a layout of the non-essential region 50 illustrated in FIG. 2 according to an embodiment of the invention. As shown in FIG. 3, the non-essential region 50 includes non-essential blocks 51-57 for storing non-essential program code and/or data. As previously discussed with respect to the structure of the main BIOS region 40 in the description of FIG. 2 above, each of the non-essential blocks 51-57 consists of a header and one or more modules which contain optional program code and/or data. The structure of a non-essential block in the non-essential region 50 will be discussed in greater detail in the description of FIG. 4 below.

Figure 4:
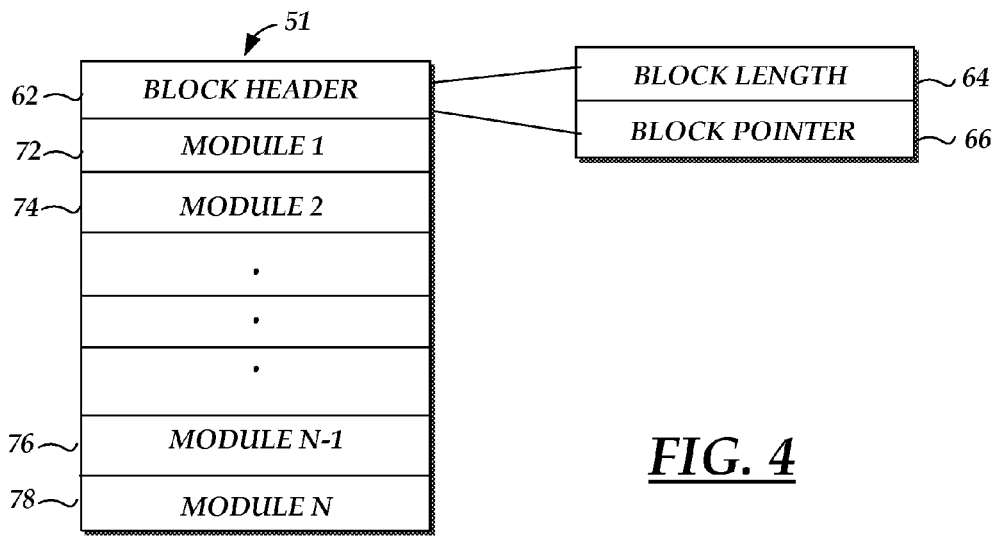
FIG. 4 is a block diagram showing a layout of a non-essential block in the non-essential region of the image file illustrated in FIG. 3 according to an embodiment of the invention.

FIG. 4 is a block diagram showing a layout of the non-essential block 51 in the non-essential region 50 illustrated in FIG. 3 according to an embodiment of the invention. As shown in FIG. 4, the non-essential block 51 includes a block header 62 and modules 72-78. The header 62 is used by the BIOS to locate the non-essential block 51. The block header 62 may further include a block length variable 64 for storing the byte size of the non-essential block and a pointer 66 for storing the memory address (in the memory device 11 of FIG. 6) of the first module included in the non-essential block (i.e., the module 72). It will be appreciated by those skilled in the art that the header 62 may also store other values related to the non-essential block 51 such as a header signature for identifying the non-essential block and checksum values which may be used by the BIOS to verify that the contents of the block is valid (i.e., not corrupted). Each of the modules 72-78 stores the program code and/or data for the non-essential block 51. The structure of a module in the non-essential block 51 will be discussed in greater detail in the description of FIG. 5 below.

Figure 5:
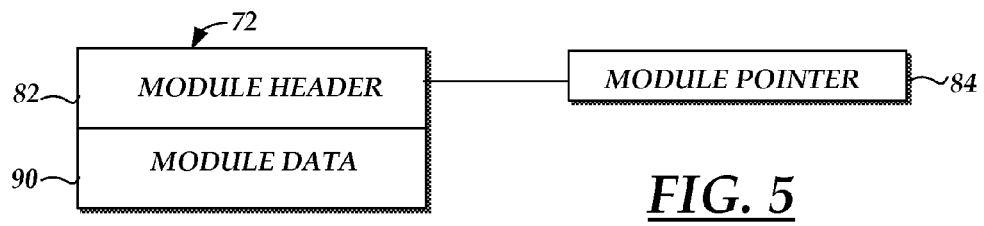
FIG. 5 is a block diagram showing a layout of a module in a non-essential block of the image file illustrated in FIG. 4 according to an embodiment of the invention.

FIG. 5 is a block diagram showing a layout of the module 72 in the non-essential block 51 illustrated in FIG. 4 according to an embodiment of the invention. As shown in FIG. 5, the module 72 includes a module header 82 and module data 90. The module header 82 may further include a module pointer 84 for storing the memory address (in the memory device 11 of FIG. 6) of the next module included in the non-essential block 51 (i.e., the module 74 of FIG. 4). The module data 90 is the program code and/or data for the module 72.

Figure 6:
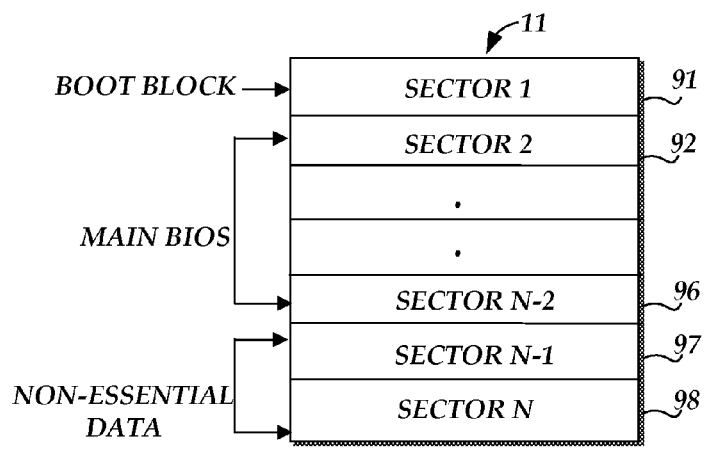
FIG. 6 is a block diagram showing a layout of the memory device in the computer system of FIG. 1 according to an embodiment of the invention.

FIG. 6 illustrates a layout of the memory device 11 in the computer system 2 of FIG. 1 according to an embodiment of the invention. As briefly discussed above in the description of FIG. 1, the image file 31 of FIG. 1 is used to program the contents of the memory device 11. As shown in FIG. 6, the memory device 11 is divided into sectors 91-98 for storing BIOS program code and data. It will be appreciated that the various parts of the BIOS program code discussed above in the description of FIG. 3 may be assigned to the sectors in the memory device 11 during the BIOS build process. Here, the boot block region is stored in sector 91 (Sector 1), the main BIOS region is stored in sectors 92-96 (Sectors 2 through N−2), and the non-essential region (i.e., the non-essential blocks) is stored in sectors 97-98 (Sectors N−1 through N). It will be appreciated that the main BIOS region may be stored in any of the sectors 1-N in the memory device 11 and that the sectors storing the program code and data for the main BIOS region need not be contiguous.

It will be appreciated that the non-essential blocks may be stored in one or more sectors depending on the sector size relative to the size of each non-essential block (including the header) when the BIOS program code is updated. For example, if the size of a non-essential block is 128 kilobytes and the size of each of the sectors in the memory device 11 is 64 kilobytes, then the non-essential block would be stored in both of the sectors 97-98. If will further be appreciated that multiple non-essential blocks may be stored in a single sector if their combined size is less than a sector size minus a paragraph multiple (i.e., 16 bytes). For example, if the combined size of three non-essential blocks is 48 kilobytes and the size of the sector 97 in the memory device 11 is 64 kilobytes, then all three of the non-essential blocks may be stored in the sector 97.

It will be appreciated by those skilled in the art that memory space in a computer system may be allocated into "paragraphs." For example, the 8086 processor architecture divides a 1 MB address space into paragraphs of 16 bytes each. Each paragraph may be uniquely identified by a 16-bit "paragraph address." The 8086 processor addressing model further defines 65,536 (64 kilobyte) "segments," each starting on a paragraph boundary identified by a 16-bit "segment register." Under the 8086 memory allocation scheme, all memory is allocated in multiples of 16 bytes such that all memory segments can be identified by a paragraph address and the full 1 MB address space can be dynamically allocated.

Figure 7:
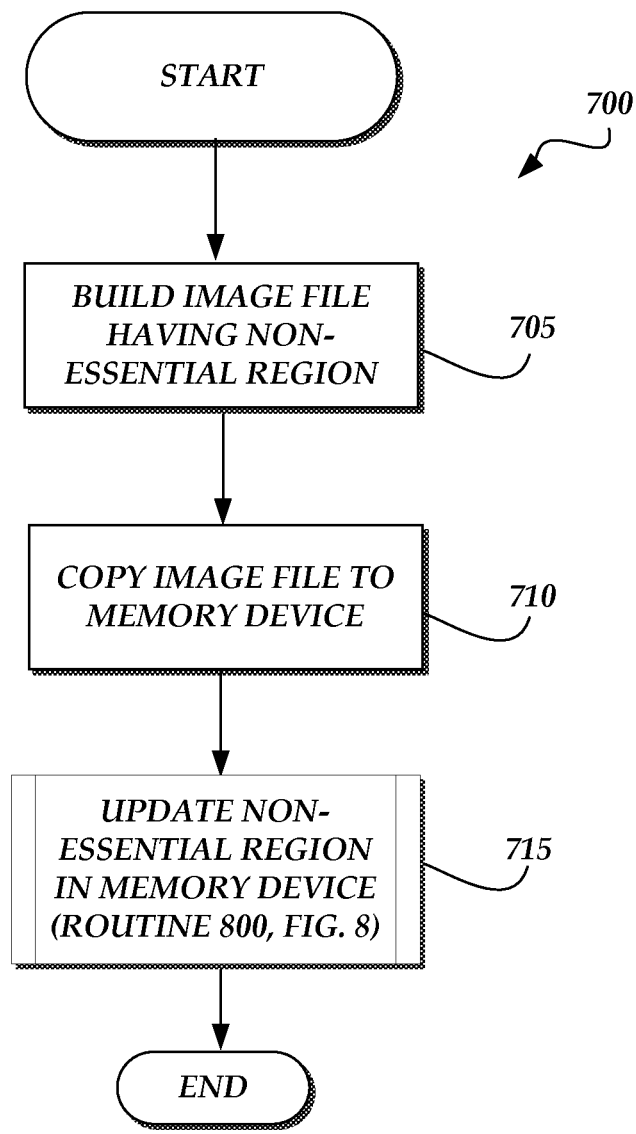
FIG. 7 illustrates an operational flow for updating the non-essential blocks in the image file in the computer system of FIG. 1 according to an embodiment of the invention.
Figure 8:
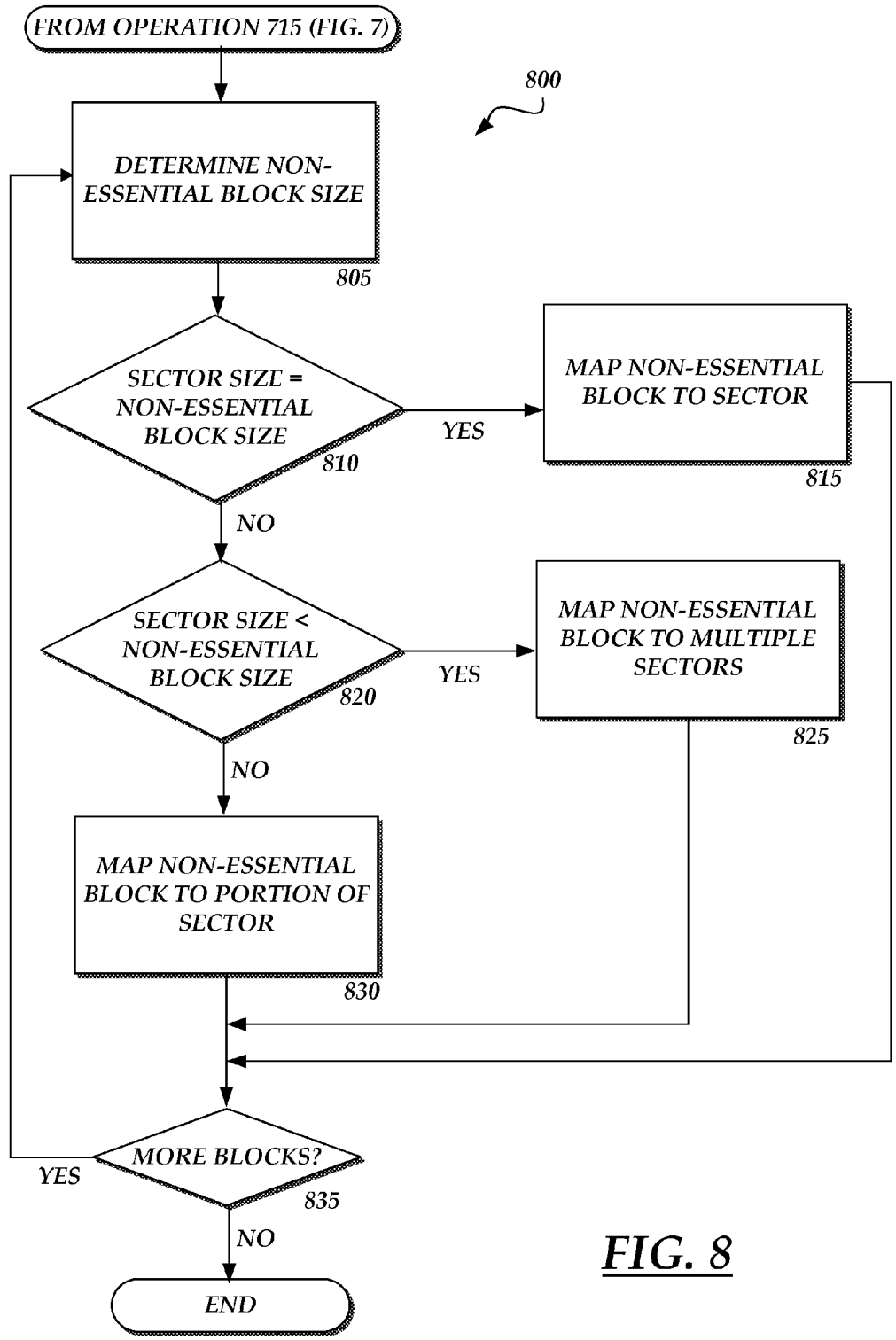
FIG. 8 illustrates an operational flow for mapping the non-essential blocks to the memory device in the computer system of FIG. 1 according to an embodiment of the invention.
Figure 9:
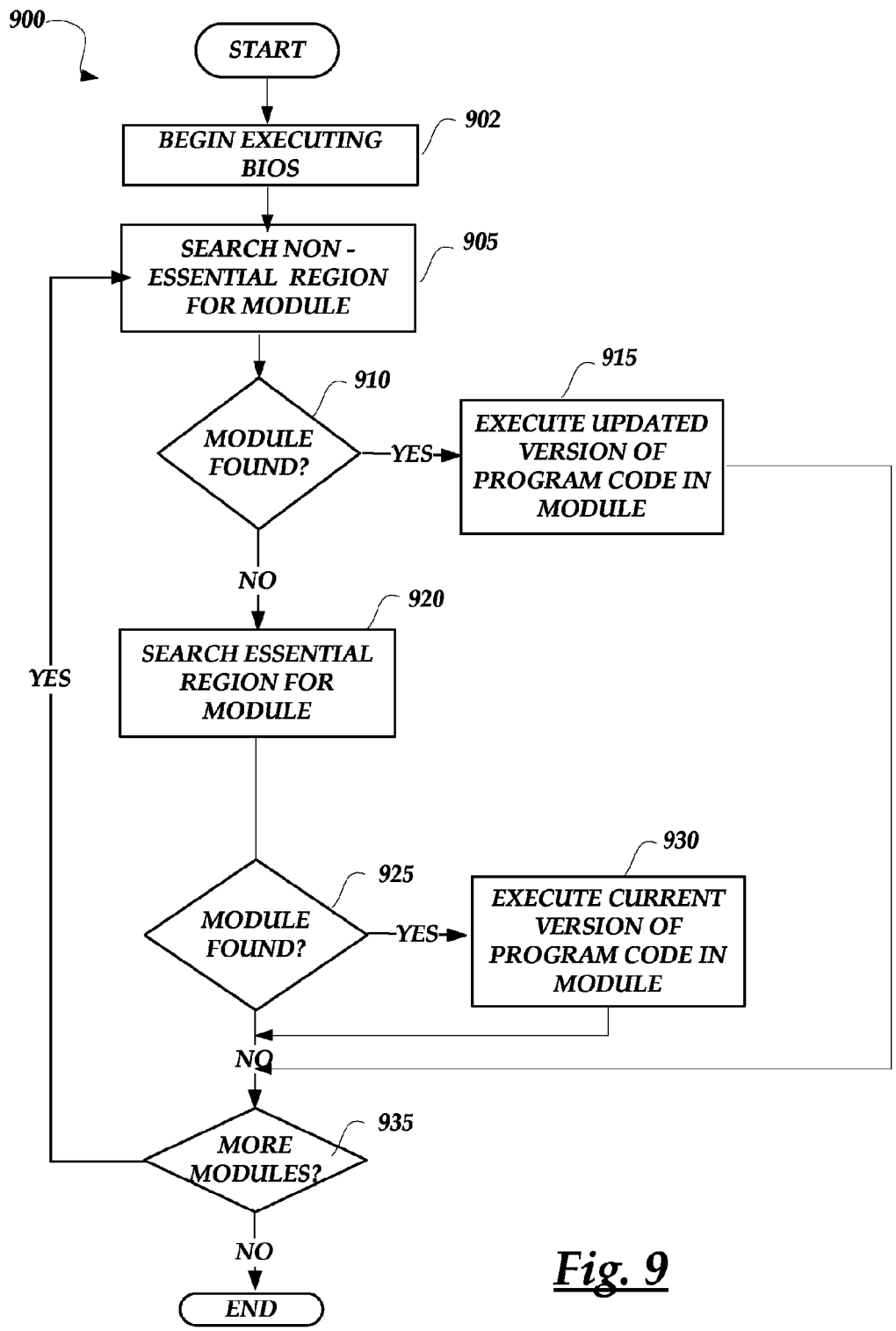
FIG. 9 illustrates an operational flow for utilizing the contents of a non-essential region in the memory device to execute program code in the computer system of FIG. 1 according to an embodiment of the invention.

FIGS. 7-9 illustrate operational flows for updating and utilizing the non-essential blocks in the memory device 11 of FIG. 6 according to an embodiment of the invention. The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Turning now to FIG. 7, the logical operations 700 begin at operation 705 where the build utility 30 is utilized to define a non-essential region in the image file 31 of FIG. 1. As discussed above in the description of FIG. 3, the non-essential region is defined to be independent of the boot block and the main BIOS regions in the image file. The build utility 30 is also utilized to assign one or more sectors to each of the regions in the image file 31 as discussed above with respect to FIG. 6. After the image file 31 containing the non-essential region is built, the logical operations 700 continue from operation 705 to operation 710 where the update utility 29 is utilized to copy the image file to the sectors in the memory device 11. It will be appreciated that in copying the image file 31 to the memory device 11, the sectors in the memory device 11 are programmed (or re-programmed) with program code and/or data contained in each region. As discussed above in the description of FIG. 6, the various parts of the BIOS program code in the image file 31 are assigned to the sectors in the memory device 11 during the BIOS build process. Thus, when the memory device 11 is programmed, the BIOS program code is written to the assigned sectors. For example, the boot block program code is written to sector 91 (Sector 1), the main BIOS program code is written to sectors 92-96 (Sectors 2 through N−2), and the non-essential program code is written to sectors 97-98 (Sectors N−1 through N) to program the memory device 11.

After the image file 31 is copied to the memory device 11, the logical operations 700 then continue from operation 710 to operation 715 where the update utility 31 is utilized to update the non-essential region in the memory device 11 with program code and/or data contained in the update file 32. It will be appreciated that, similar to the image file 31, the update file 32 may contain non-essential program code and/or data in blocks. In updating the memory device 11, only the non-essential sectors 97 and 98 in the memory device 11 are re-programmed. An illustrative operational flow for updating the non-essential sectors in the memory device 11 will be described in greater detail with respect to FIG. 8 below. It will be appreciated that in only updating the non-essential sectors in the memory device 11, the critical BIOS program code (e.g., the POST and runtime routines) will still execute in the event the program code in the non-essential blocks contains errors or is corrupted. For example, upon bootup of the computer system 2, the BIOS program code may be updated to first look for and execute BIOS modules in the main BIOS region (i.e., by searching for a specific module identification in the header of each module) and then in the non-essential region.

FIG. 8 illustrates an operational flow for updating the sectors in the memory device 11 with non-essential blocks. The logical operations 800 begin at operation 805 where the update utility 31 determines the size of a non-essential block to be programmed or mapped to the sectors of the memory device 11 reserved for non-essential blocks. As discussed above with respect to FIG. 6, the block size of each non-essential block may be stored in the header of each block. If at operation 810, the update utility 31 determines that the size of a first sector is equal to the size of a non-essential block, then the logical operations 800 continue to operation 815 where the non-essential block is mapped to the first sector in the non-essential region of the memory device. For example, if a non-essential block containing program code for displaying graphics data is 64 kilobytes and the size of the first sector is 64 kilobytes, then all of the program code for displaying the graphics data will be mapped to the first sector in the non-essential region in the memory device.

Continuing now with FIG. 8, if at operation 810, the update utility 31 determines that the size of the first sector is not equal to the size of a non-essential block, then the logical operations 800 continue to operation 820 where it is determined whether the size of the first sector is less than the size of a non-essential block. If at operation 820 it is determined that the size of the first sector is less than the size of a non-essential block, then the logical operations 800 continue to operation 825 where the non-essential block is mapped to multiple sectors in the non-essential region of the memory device. It will be appreciated that if the contents of the non-essential block completely fill one sector but fill less than a subsequent sector, then the non-essential block contents may be mapped to a paragraph multiple of the subsequent sector. If, however, at operation 820 the update utility 31 determines that the size of the first sector is greater than the size of a non-essential block, then the logical operations continue to operation 830 where the update utility maps the non-essential block contents to a portion of the first sector in the non-essential region in the memory device. It will be appreciated that the size of the portion of the first sector may be a paragraph multiple. If, at operation 835, the update utility 31 determines that there are more non-essential blocks to update, then the logical operations start over at operation 805 with the next non-essential block. If this is the last non-essential block, then the update ends.

In an alternative embodiment of the invention, the non-essential region may also be utilized for executing updated modules containing program code for the main BIOS region. In this embodiment, the BIOS program code may be updated to first look for and execute modules in the non-essential region (i.e., by searching for a specific module identification in the header of each module) and then in the main BIOS region. In this manner, updated modules for the main BIOS region may be executed without having to update the entire main BIOS region. Furthermore, by placing updated modules in the non-essential region, the program code in the essential region will still execute in the event the program code in the non-essential region is corrupted.

FIG. 9 illustrates an operational flow 900 for utilizing the contents of a non-essential region in the memory device to execute program code in the computer system of FIG. 1 according to an embodiment of the invention. The logical operations 900 begin at operation 902 where the CPU 4 begins executing the BIOS program code contained in the memory device 11 in the computer system 2. The BIOS program code may be executed, for example, after bootup of the computer system. As previously described in the discussion of FIG. 2 above, the BIOS program code may be stored as a linked list of executable modules. It should be understood that in this embodiment, modules contained in the non-essential region include updated BIOS program code while modules contained in the essential region include current BIOS program code.

After the BIOS program code has started executing at operation 902, the logical operations 900 continue from operation 902 to operation 905 where a routine in the BIOS program code searches the non-essential region in the memory device 11 for a module in the linked list. The logical operations 900 then continue from operation 905 to operation 910. At operation 910, if the module being searched for is found, the logical operations 900 continue from operation 910 to operation 915 where the updated version of the program code contained in the module is executed. It will be appreciated that a module may be found or identified from the module header contained in each module. The logical operations 900 then continue from operation 915 to operation 935 where the routine determines if there are any more modules to be found (i.e., more modules in the linked list). If it is determined at operation 935 that there are more modules to be found, the logical operations 900 return from operation 935 to operation 905 to search the non-essential region for the module. If it is determined at operation 935 that there are no more modules to be found then the logical operations 900 then end.

If at operation 910, the module being searched for is not found, then the logical operations 900 continue from operation 910 to operation 920 where the routine in the BIOS program code searches the essential region in the memory device 11 for the module in the linked list. It will be appreciated that a module may be found or identified from the module header contained in each module. The logical operations 900 then continue from operation 920 to operation 925. At operation 925, if the module being searched for is found, the logical operations 900 continue from operation 925 to operation 930 where the current version of the program code contained in the module is executed. The logical operations 900 then end. If at operation 925, the module being searched for is not found, then the logical operations 900 continue to operation 935 where the routine determines if there are any more modules to be found (i.e., more modules in the linked list). If it is determined at operation 935 that there are more modules to be found, the logical operations 900 return from operation 935 to operation 905 to search the non-essential region for the module where the routine continues to the next module in the linked list. The logical operations 900 then return from operation 935 to operation 905 where the routine searches for the module in the non-essential region. If it is determined at operation 935 that there are no more modules to be found then the logical operations 900 then end.

As discussed above, embodiments of the present invention enable the update and utilize the contents of a non-essential region in one or more memory devices in a computer system. The non-essential region may be updated using an update utility without effecting critical program code in other regions of the image. Although the invention has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

We claim:

1. A computer-readable storage medium that is not a signal having computer-executable instructions stored thereon that, when executed by a computer system, cause the computer system to:
   maintain a list of modules to be executed by the computer system;
   search for at least one module identified in the list in a non-essential region in a non-volatile memory device included within the computer system, wherein the non-volatile memory device comprises a plurality of modules containing program code for the computer system, wherein the at least one module in the non-essential region does not contain boot code;
   upon finding the at least one module in the non-essential region, execute the program code in the at least one module from the non-essential region of the non-volatile memory device, wherein the at least one module in the non-essential region contains an updated version of the program code for the computer system;
   upon not finding the at least one module in the non-essential region, search an essential region in the non-volatile memory device for the at least one module, wherein the at least one module in the essential region contains a current version of the program code for the computer system, wherein the at least one module in the essential region does not contain boot code; and
   upon finding the at least one module in the essential region, execute the program code in the at least one module found in the essential region.

2. The computer-readable storage medium of claim 1, wherein the at least one module further comprises a module header, the module header comprising an identification of the program code contained in the at least one module.

3. The computer-readable storage medium of claim 2, further comprising computer-executable instructions for causing the computer system to:
   upon not finding the at least one module in the essential region, determine if there is at least one more module identified in the list to be found; and
   upon determining that there is at least one more module to be found, search the non-essential region to find the at least one more module.

4. The computer-readable storage medium of claim 3, wherein searching the non-essential region in the non-volatile memory device for at least one module comprises searching for a specific module identification in the module header of each of the modules stored in the non-essential region.

5. The computer-readable storage medium of claim 4, wherein the list comprises a linked list of executable modules.

6. The computer-readable storage medium of claim 3, wherein searching the non-essential region to find the at least one more module comprises searching the non-essential region to find the next module identified in the list that contains an updated version of the program code for the computer system.

7. The computer-readable storage medium of claim 6, further comprising computer-executable instructions for causing the computer system to, upon finding the at least one more module in the non-essential region, execute the program code in the at least one more module.

8. The computer-readable storage medium of claim 1, wherein the updated version of the program code contained in the non-essential region comprises updated program code for a basic input-output system (BIOS) in the computer system.

9. The computer-readable storage medium of claim 1, wherein the at least one module further comprises module data including at least one of graphics data, a language module, and diagnostic tools.

10. A computer-implemented method for updating and utilizing the contents of a non-essential region in a non-volatile memory device, the computer-implemented method comprising:
    maintain a list of modules to be executed;
    searching the non-essential region in the non-volatile memory device for at least one module identified in the list, wherein the non-volatile memory device comprises a plurality of modules containing program code for the computer system, wherein the at least one module in the non-essential region does not contain boot code;
    upon finding the at least one module in the non-essential region, executing the program code in the at least one module from the non-essential region, wherein the at least one module in the non-essential region contains an updated version of the program code for the computer system;
    upon not finding the at least one module in the non-essential region, searching an essential region in the non-volatile memory device for the at least one module, wherein the at least one module in the essential region contains a current version of the program code for the computer system, wherein the at least one module in the essential region does not contain boot code; and
    upon finding the at least one module in the essential region, executing the program code in the at least one module found in the essential region.

11. The computer-implemented method of claim 10, further comprising:
    upon not finding the at least one module in the essential region, determining based upon the list if there is at least one more module to be found; and
    upon determining that there is at least one more module to be found, searching the non-essential region to find the at least one more module.

12. The computer-implemented method of claim 11, wherein the updated version of the program code contained in the non-essential region comprises updated program code for a BIOS in the computer system.

13. The computer-implemented method of claim 12, wherein the at least one module further comprises a module header, the module header comprising an identification of the program code contained in the at least one module.

14. The computer-implemented method of claim 13, wherein searching the non-essential region in the non-volatile memory device for at least one module comprises searching for a specific module identification in the module header of each of the at least one module.

15. The computer-implemented method of claim 14, wherein the list comprises a linked list of executable modules.

16. A computer system, comprising:
    a non-volatile memory device comprising a plurality of modules containing program code for the computer system and having a non-essential region;
    a memory for storing a program containing code for updating and utilizing the contents of the non-essential region in the non-volatile memory device; and
    a processor, functionally coupled to the memory and the non-volatile memory device, wherein the processor is responsive to computer-executable instructions contained in the program and configured to
    maintain a list of modules to be executed on the computer system;

search the non-essential region in the non-volatile memory device included within the computer system for at least one module identified in the list, wherein the at least one module in the non-essential region does not contain boot code, upon finding the at least one module in the non-essential region, to execute the program code in the at least one module found in the non-essential region, wherein the at least one module in the non-essential region contains an updated version of the program code for the computer system, upon not finding at least one module in the non-essential region, search an essential region in the non-volatile memory device for the at least one module, wherein the at least one module in the essential region contains a current version of the program code for the computer system, wherein the at least one module in the essential region does not contain boot code, and upon finding the at least one module in the essential region, execute the program code in the at least one module found in the essential region.

17. The computer system of claim 16, wherein the processor is responsive to computer-executable instructions contained in the program and further configured to:
  upon not finding the at least one module in the essential region, determine based upon the list if there is at least one more module to be found; and
  upon determining that there is at least one more module to be found, search the non-essential region to find the at least one more module.

18. The computer system of claim 17, wherein the updated version of the program code contained in the non-essential region comprises updated program code for a BIOS in the computer system.

19. The computer system of claim 18, wherein the at least one module further comprises a module header, the module header comprising an identification of the program code contained in the at least one module.

20. The computer system of claim 19, wherein search the non-essential region in the non-volatile memory device for at least one module comprises searching for a specific module identification in the module header of each of the at least one module.

\* \* \* \* \*